US012751478B2

(12) United States Patent
Kloek

(10) Patent No.: US 12,751,478 B2
(45) Date of Patent: Oct. 6, 2026

(54) FAT BLEND SUITABLE FOR INFANT NUTRITION

(71) Applicant: FrieslandCampina Nederland B.V., Amersfoort (NL)

(72) Inventor: William Kloek, Veghel (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 141 days.

(21) Appl. No.: 18/870,321

(22) PCT Filed: Jun. 1, 2023

(86) PCT No.: PCT/EP2023/064728
§ 371 (c)(1),
(2) Date: Nov. 27, 2024

(87) PCT Pub. No.: WO2023/232962
PCT Pub. Date: Dec. 7, 2023

(65) Prior Publication Data

US 2025/0325014 A1 Oct. 23, 2025

(30) Foreign Application Priority Data

Jun. 2, 2022 (EP) .................................... 22176902

(51) Int. Cl.
*A23L 33/00* (2016.01)
*A23D 9/007* (2006.01)

(52) U.S. Cl.
CPC .............. *A23L 33/40* (2016.08); *A23D 9/007* (2013.01)

(58) Field of Classification Search
CPC ........ A23C 15/04; A23L 33/115; A23L 33/12; A23L 33/40; C11B 7/0075
See application file for complete search history.

(56) References Cited

U.S. PATENT DOCUMENTS

| | | | |
|---|---|---|---|
| 2017/0360076 A1 | 12/2017 | Jonathan | |
| 2022/0143096 A1 | 5/2022 | Feitsma | |
| 2023/0397643 A1 | 12/2023 | Brouwer | |

FOREIGN PATENT DOCUMENTS

| | | |
|---|---|---|
| CN | 104619197 | 5/2015 |
| CN | 113575697 | 11/2021 |
| WO | 2005036987 | 4/2005 |
| WO | 2008138821 | 11/2008 |
| WO | 2014142648 | 9/2014 |
| WO | 2016097220 | 6/2016 |
| WO | 2018024629 | 2/2018 |
| WO | 2018109203 | 6/2018 |
| WO | 2018178310 | 10/2018 |
| WO | 2019211185 | 11/2019 |

OTHER PUBLICATIONS

Deffense, E.; "Milk Fat Fractionation Today: A Review1"; Journal of the American Oil Chemists Society, vol. 70, No. 12, Dec. 1, 1993, pp. 1193-1201.
Illingworth, D., et al.; "Anhydrous Milk Fat Manufacture and Fractionation" In: "Dairy Fats and Related Products"; Blackwell Publishing Ltd, Singapore, Oct. 27, 2009, pp. 108-166.
Sorensen, Ann-Dorit Moltke, et al.; "Human Milk Fat Substitute from Butterfat: Production by Enzymatic Interesterification and Evaluation of Oxidative Stability", Journal of the American Oil Chemists Society, vol. 87, 2010, pp. 185-194.
Rizvi, S.S.H., et al.; "Supercritical Fluid Processing of Milk Fat: Fractionation, Scale-Up, and Economics", Food Technology, Institute of Food Technologists, vol. 49, No. 2, Feb. 1, 1995, pp. 90-97.
International Search Report and Written Opinion, date of mailing Aug. 17, 2023, International Application No. PCT/EP2023/064728 (10 pgs.).

*Primary Examiner* — Michele L Jacobson
(74) *Attorney, Agent, or Firm* — Fitch, Even, Tabin & Flannery LLP

(57) ABSTRACT

Fat blend comprising (i) 20-65 wt % of a vegetable lipid source and (ii) 35-80 wt % of a milk fat composition comprising at least one bovine milk fat fraction, wherein the milk fat composition comprises, relative to total fatty acid moieties, 37-48 mol % of long chain saturated fatty acid moieties with 12-18 carbon atoms (LCSFA C12:0-C18:0) and wherein 28-43 mol % of all fatty acid moieties positioned on the sn-1,3 position of the glycerol backbone in said milk fat composition are long chain saturated fatty acid moieties with 12-18 carbon atoms (LCSFA C12:0-C18:0).

13 Claims, No Drawings

FAT BLEND SUITABLE FOR INFANT NUTRITION

CROSS REFERENCE TO RELATED APPLICATIONS

This application is a U.S. national phase application of International Application No. PCT/EP2023/064728, filed Jun. 1, 2023, which claims benefit from European Application No. 22176902.9, filed Jun. 2, 2022, which are each hereby incorporated herein by reference in their entirety.

The present invention relates to a fat blend, more in particular a fat blend suitable for use in infant nutrition. The fat blend comprises a bovine milk fat fraction and vegetable lipids.

Nutritional compositions for infants aim to resemble human milk as much as possible, as human milk is generally seen as the ideal source of nutrition for infants up to at least 6 months of age. Although infant formula has become better and better over time, there are still important differences between human milk and infant formula leading to lower fat and calcium absorption in infants fed with infant formula as compared to infants fed with human milk. In addition, infants fed with infant formula more often suffer from gut discomfort and/or even constipation caused by more solid stools and more infrequent bowel movements. This may lead to babies crying more and hence to more anxiety with parents. In contrast, breast-fed infants exhibit frequent and looser/watery stools which, in return, leads to a better gut comfort. These effects of infant formula are generally attributed for a large part to the difference in fat compositions between human milk and infant formula. More specifically, the composition of triacylglycerols (TAG) in infant formula, usually originating from vegetable and/or bovine milk lipid sources, differs from that in human milk.

Human milk fat consists of TAG that contain saturated and unsaturated fatty acids esterified at the sn-1, sn-2 and sn-3 position of a glycerol molecule. While human milk fat, bovine milk fat, and vegetable oils such as palm oil are all rich in long chain saturated fatty acids (LCSFA), such as palmitic acid (C16:0), myristic acid (C14:0) and stearic acid (C18:0), the distribution of palmitic acid over the glycerol backbone differs among these different lipid sources. In human milk fat, most of the LCSFA is esterified at the sn-2 position of the glycerol molecule. During digestion, however, mainly the fatty acids at the sn-1 and sn-3 positions are released, meaning that digestion of human milk releases only minor amounts of LCSFA, which leads to a lower insoluble calcium and magnesium fatty acid soap formation in the intestine. Bovine milk fat and especially vegetable oils, on the other hand, have much higher proportions of LCSFA esterified at the sn-1 and/or sn-3 positions of the glycerol backbone, resulting in release of more free long chain saturated fatty acids in the digestive process which, in return, may lead to formation of more insoluble fatty acid soaps in the intestine. These insoluble soaps are excreted with the faeces and cause such faeces to be more solid and harder. Accordingly, infants suffer from harder stools leading to complaints such as abdominal pain, gut discomfort and constipation as of ten expressed by crying. The formation of calcium soaps also means that less calcium is absorbed in the intestines and hence less calcium from the nutritional composition is available for bone mineralization. Likewise, more excretion of such soaps means less fat absorption and hence less caloric intake which could in some cases lead to nourishing problems.

Evidently, there is a desire to reduce the aforesaid complaints by reducing the excretion of calcium soaps and magnesium soaps and hence ensuring softer stools, thereby reducing gut discomfort and/or constipation.

In order to address these issues, various fat compositions have been proposed for infant formula.

For instance, WO 2016/097220 discloses an infant formula comprising an oil mix wherein 20-80%, most preferably 35-65% of the total palmitic acid content is located on the sn-2 position. The oil mix is a blend of vegetable fats and oils.

WO 2008/138821 discloses the use of milk fat, such as butter or cream, in infant formula. The milk fat comprises 10-50 wt %, most preferably 20-28 wt % palmitic acid, 30-75%, most preferably 40-45% thereof being positioned on sn-2.

It is also disclosed to synthetically produce fat compositions with a high concentration of palmitic acid moieties on the sn-2 position. WO 2005/036987, for instance, discloses an enzymatically prepared fat blend comprising not more than 38% palmitic acid residues and at least 60%, preferably at least 62% of the sn-2 positions being palmitic acid residues. The fat blend is prepared by reacting a palmitic acid-rich vegetable oil with oleic acid in the presence of a 1,3-regio-specific lipase, distilling the excess free fatty acids, followed by bleaching and optionally deodorizing the resulting oil.

If milk fat is used as a fat source in infant formula, mainly cream or whole milk are used, but anhydrous milk fat (AMF) is also a known source of milk fat. AMF is produced from bovine cream. It is widely available, and its production only involves physical separation of the serum phase and the fat phase of the cream by homogenisation and centrifugation; it does not involve further fractionation steps. In AMF, about 65 mol % of the all fatty acid moieties positioned on the sn-2 position of the glycerol backbone are long chain saturated fatty acid moieties with 12-18 carbon atoms (LCSFA C12:0-C18:0) and about 44 mol % of the all fatty acid moieties positioned on the sn-1 plus sn-3 position (abbreviated as: sn-1,3 position) of the glycerol backbone are long chain saturated fatty acid moieties with 12-18 carbon atoms (LCSFA C12:0-C18:0).

It has now been found that fat blends with a lower saturated fatty acid content on sn-1,3 can also be obtained from milk, by using specific milk fat fractions. Milk fat fractions are of natural origin and have not been chemically or enzymatically synthesized or refined. Neither does their production require the use of palm oil; a rather controversial oil in view of the environmental impact of palm tree agriculture, in particular deforestation. Furthermore, in contrast to vegetable oils, milk fat and, therefore, milk fat fractions, contributes to an appreciated flavour and is rich in short chain fatty acids (SCFA)—such as butyric (C4:0) and hexanoic (C6:0) acid—which are known to have a positive effect on immune modulation. The C4:0 content of AMF is about 9-11 mol %. Milk fat and milk fat fractions further contain vitamins and a wide range of different fatty acids, both in terms of chain length and branching, thereby providing high nutritional value.

The present invention relates to a fat blend comprising:

20-65 wt % of a vegetable lipid source 35-80 wt % of a milk fat composition comprising at least one bovine milk fat fraction, wherein the milk fat composition comprises, relative to total fatty acid moieties, 37-48 mol % of long chain saturated fatty acid moieties with 12-18 carbon atoms (LCSFA C12:0-C18:0) and wherein 28-43 mol % of all fatty acid moieties positioned on the sn-1,3 position of the glycerol backbone in said milk fat composition are long chain saturated fatty acids with 12-18 carbon atoms (LCSFA C12:0-C18:0).

The terms “fat”, “oil”, and “lipid” are used herein interchangeably.

Lipids, under the scope of this invention, include triglycerides and derivatives thereof, such as mono- and di-glycerides.

The term “fatty acid moieties” refers to fatty acid residues, i.e. acyl groups that are bound to the glycerol chain by esterification of the corresponding fatty acid and the glycerol alcohol group.

The fat blend according to the invention comprises 35-80 wt %, preferably 40-80 wt %, more preferably 50-80 wt %, even more preferably 55-78 wt %, and most preferably 70-75 wt % of a milk fat composition. Said milk fat composition comprises, relative to total fatty acid moieties, 37-48 mol %, preferably 38-42 mol %, most preferably 38-40 mol % of long chain saturated fatty acid moieties with 12-18 carbon atoms (LCSFA C12:0-C18:0) and 28-43 mol %, preferably 32-40 mol % most preferably 32-38 mol % of all fatty acid moieties positioned on the sn-1,3 position of the glycerol backbone in said milk fat composition are long chain saturated fatty acid moieties with 12-18 carbon atoms (LCSFA C12:0-C18:0).

“Milk fat composition” is defined as a composition consisting of one or more milk fat fractions, and optionally anhydrous milk fat and/or ghee.

“Anhydrous milk fat” is herein defined as anhydrous milk fat that has not been subjected to fractionation steps.

“Milk fat fraction” is defined as a fraction obtained by fractionation of anhydrous milk fat. Further details on fractionation processes are given below.

In one embodiment, the milk fat composition consists of one bovine milk fat fraction. In said milk fat fraction 37-48 mol %, preferably 38-42 mol %, most preferably 38-40 mol % of the total fatty acid moieties are long chain saturated fatty acid moieties with 12-18 carbon atoms (LCSFA C12:0-C18:0) and 28-43 mol %, preferably 32-40 mol %, most preferably 32-38 mol % of all fatty acid moieties positioned on the sn-1,3 position of the glycerol backbone in said milk fat fraction are long chain saturated fatty acid moieties with 12-18 carbon atoms (LCSFA C12:0-C18:0).

In another embodiment, the milk fat composition is a mixture of two or more bovine milk fat fractions, 37-48 mol %, preferably 38-42 mol %, most preferably 38-40 mol % of the total fatty acid moieties in said mixture being long chain saturated fatty acid moieties with 12-18 carbon atoms (LCSFA C12:0-C18:0) and 28-43 mol %, preferably 32-40 mol %, most preferably 32-38 mol % of all fatty acid moieties positioned on the sn-1,3 position of the glycerol backbone in said mixture are long chain saturated fatty acids with 12-18 carbon atoms (LCSFA C12:0-C18:0).

In a further embodiment, the milk fat composition is a mixture of at least one bovine milk fat fraction with anhydrous milk fat and/or ghee. The anhydrous milk fat and/or ghee can be obtained from bovine milk, goat milk, camel milk, or milk from various other mammals. Preferred is a mixture with anhydrous milk fat; the preferred anhydrous milk fat being bovine milk fat. 37-48 mol %, preferably 38-42 mol %, most preferably 38-40 mol % of the total fatty acid moieties are long chain saturated fatty acid moieties with 12-18 carbon atoms (LCSFA C12:0-C18:0) and 28-43 mol %, preferably 32-40 mol %, most preferably 32-38 mol % of all fatty acid moieties positioned on the sn-1,3 position of the glycerol backbone in said mixture are long chain saturated fatty acids with 12-18 carbon atoms (LCSFA C12:0-C18:0).

Milk fat fractions not only differ in the distribution of the LCSFA over the triglyceride backbone, they also differ in the content of butyric acid moieties (C4:0). The milk fat composition present in the fat blend according to the present invention preferably has a content of butyric acid moieties of 8-15 mol %, more preferably 12-15 mol %, most preferably 13-15 mol %.

The milk fraction to be used in the fat blend according to the present invention preferably has a melting point that is above not more than 21° C., more preferably not more than 17° C., even more preferably not more than 12° C., even most preferably below 8° C. The melting point of said milk fat fraction is preferably not lower than 4° C. The melting point being defined as the final melting temperature (the temperature at the end of the final melting endotherm) as determined by Differential Scanning calorimetry (DSC).

The content of the different fatty acids in anhydrous milk fat, milk fat fractions, and the milk fat composition can be determined by standard method ISO 15884/IDF 182:2002 (Milk fat—Preparation of fatty acid methyl esters) and ISO 15885/IDF 184 (Milk fat—Determination of the fatty acid composition by gas-liquid chromatography).

The distribution of fatty acids over the glycerol backbone is determined by using enzymatic transesterification using an immobilized *Candida Antartica* Lipase (JOCS/AOCS Official method Ch 3a-19). In short, the sn-1,3 fatty acids are hydrolysed, and the sn-2 fatty acids are isolated by solid phase extraction and converted to FAME using base-catalysed methanolysis. The individual FAME are separated by GC analysis using split injection and flame ionization detection. The sn-1,3 fatty acid (FA_sn13) composition is calculated from the total molar fatty acid (FA_total) composition and the molar sn-2 fatty acid (FA_sn2) composition using the equation:

$$FA\_sn13 = (3{*}FA\_total - FA\_sn2)/2$$

Anhydrous milk fat is a fat mixture originating from milk, which is generally a mixture of triacylglycerols of a large variety of fatty acids.

Milk fat fractions can be obtained by milk fat fractionation techniques known to a person skilled in the art, including supercritical $CO_2$ extraction, fractionation with solvent, short path distillation and dry fractionation; vacuum filtration, centrifugation and the use of a membrane press are also suitable. Most preferred are fractionation techniques that do not involve the use of solvents, and in particular do not involve organic solvents and or surface active agents. Preferred fractionation techniques may be selected from the group comprising supercritical $CO_2$ extraction, short path distillation, dry fractionation, vacuum filtration, centrifugation and the use of a membrane press. The milk fat fraction for use in the present invention can be obtained by single or multi-step dry fractionation—i.e. fractionation by crystallization and subsequent filtration—of milk fat. Preferably, bovine anhydrous milk fat is used to obtain the milk fat fraction.

Fractionation by crystallisation may be based on partial crystallisation of triglycerides with a high melting point, caused by controlled slow cooling under mild stirring, followed by their separation from the remaining liquid fats by filtration or centrifugation. The solid phase formed by the crystals is the called stearin(S) fraction and the remaining liquid phase is called the olein (O) fraction. The operation may be repeated in multiple ways on oleins and/or stearins obtained by subsequent melting and cooling steps at different temperatures.

These successive operations performed on the fat fractions obtained in the previous steps are called multi-step fractionations. For example, from a first olein fraction a second olein and a second stearin fraction are obtained, being denoted as olein-olein (OO) or olein-stearin (OS) respectively. These multi-step fractions may again be fractionated. For example, the OS fraction is further fractionated into an olein fraction (OSO) and a stearin fraction (OSS). In general, the order of fractionating is indicated, e.g. SO is the olein fraction of a stearin fraction.

The milk fat fraction(s) to be present in the fat blend according to the present invention is/are preferably O, OO, OOO, and/or OOOO fractions, more preferably OO, OOO, and/or OOOO fractions, even more preferably OOO and/or OOOO fractions, and most preferably the OOOO fraction.

Compared to stearin fractions, like OS, OOS, and OOOS, the O, OO, OOO, and OOOO-fractions have a lower soap forming capacity and a higher content of flavour components and fat-soluble vitamins.

The fat blend of the present invention comprises 20-65 wt %, preferably 22-50 wt %, most preferably 25-30 wt % of a vegetable lipid source. The vegetable lipid source may serve to comply with legally required long chain-polyunsaturated fatty acid contents of infant nutrition.

Suitable vegetable lipid sources include soy bean oil, (high oleic) sunflower oil, canola oil, (high oleic) rapeseed oil, ground nut oil, cotton seed oil, maize oil, olive oil, (high oleic) safflower oil, sesame oil, rice bran oil, evening primrose oil, borage oil, flax seed oil, palm oil, palm olein, palm stearin, palm kernel oil, coconut oil, and babassu oil. Preferred vegetable lipid sources are soy bean oil, canola oil, (high oleic) sunflower oil, (high oleic) safflower oil, coconut oil, and (high oleic) rapeseed oil.

Palm oils, including palm oil, palm olein, palm stearin, and palm kernel oil, are less desired in view of the negative environmental impact of palm tree agriculture, in particular deforestation. Therefore, the fat blend according to the present invention is preferably free of palm oil or components synthesized with or derived from palm oil. Furthermore, the fat blend preferably contains only natural fats and oils, that is: no chemically and/or enzymatically synthesized oils or fats, such as chemically and/or enzymatically synthesized interesterified vegetable fats.

The total LCSFA C12:0-C18:0 content of the fat blend according to the present invention is preferably in the range 22-35 mol %, most preferably 25-32 mol %.

Preferably, 22-33 mol %, most preferably 24-30 mol % of all fatty acid moieties positioned on the sn-1,3 position of the glycerol backbone in the fat blend are long chain saturated fatty acids with 12-18 carbon atoms.

The total butyric acid (C4:0) of the fat blend is preferably in the range 4-12 mol %, more preferably 6-12 mol %, and most preferably 7-11 mol %.

The fat blend according to the present invention can be prepared by conventional procedures, such as by blending the vegetable lipid source(s) with the milk fat composition in liquid, e.g. melted, form.

The fat blend according to the invention can be used in various nutritional compositions, such as medical nutrition, formula milk, and other nutritional products for young children. Formula milk includes infant formula, follow-on formula, and growing-up milk. Infant formula is intended for infants in the first 6 months of life; follow-on formula is designed for children of 6-12 months, and growing-up milk is designed for children of one year onwards.

The use of the fat blend of the present invention can assist in reducing the intestinal formation of calcium and magnesium fatty acid soaps, in particular palmitic acid soaps. This will result in a better stool consistency (i.e. softer stool) and hence will relieve any gut discomfort, abdominal pain and/or constipation; in infants and young children but also in adults suffering from gut discomfort, abdominal pain and/or constipation.

The nutritional composition preferably comprises the fat blend in a concentration of 15-33 wt %, more preferably 20-30 wt %, and most preferably 21-28 wt %, based on dry weight.

Apart from the fat blend according to the present invention, the nutritional composition may comprise one or more protein sources, carbohydrates, vitamins, minerals, spore elements, and/or long chain polyunsaturated fatty acids (LC-PUFAs) such as docosahexaenoic acid (DHA), eicosapentaenoic acid (EPA), arachidonic acid (ARA), and mixtures thereof.

Examples of protein sources are sources of whey/serum proteins, milk, milk fat globular membrane (MFGM) sources, but also sources of plant proteins.

Examples of carbohydrates that are preferably present in formula milk are lactose, non-digestible oligosaccharides such as galacto-oligosaccharides (GOS) and/or fructo-oligosaccharides (FOS) and human milk oligosaccharides (HMOs).

Examples of vitamins and minerals that are preferably present in formula milk are vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. Minerals are usually added in salt form.

If necessary, nutritional compositions, such as formula milk, may contain emulsifiers and stabilisers such as soy lecithin, citric acid esters of mono- and di-glycerides, and the like. It may also contain other substances which may have a beneficial effect such as lactoferrin, nucleotides, nucleosides, and the like.

EXAMPLE

Milk fat fractions were prepared by a multi-step dry fractionation process according to the Tirtiaux process. In the first step, AMF was melted to a temperature of about 55-58° C., which is about 20° C. above its final melting temperature. This was done to erase crystal memory. Subsequently, the molten AMF was cooled down to a temperature of about 30° C. in a double jacket crystallizer equipped with a stirring device and cooling surfaces. As a result of the cooling down, a part of the molten AMF crystallized. The remaining liquid fraction (O) and a crystal slurry (S, to which some olein adhered) where separated by filtration.

The O-fraction had a final melting temperature of about 21° C.

Subsequently, the liquid fraction (O) was subjected to a second dry fractionation step. In this step, the liquid fraction was first heated to about 60° C. and then cooled to a temperature of about 22° C. Part of the oil crystallized. The remaining liquid (OO) and a crystal slurry (OS, to which some olein adhered) were separated by filtration. The OO-fraction had a final melting temperature of about 17° C.

The OO fraction was subjected to a third dry fractionation step, resulting in an OOO and a OOS fraction. The OOO fraction was subjected to a fourth dry fractionation step, resulting in an OOOO and an OOOS fraction. The melting points of the OOO and the OOOO fractions were respectively 12 and 6° C.

The fatty acid content of the different fractions was determined using ISO 15884/IDF 182:2002 (Milk fat—Preparation of fatty acid methyl esters) and ISO 15885/IDF 184 (Milk fat—Determination of the fatty acid composition by gas-liquid chromatography). The distribution of fatty acids over the glycerol backbone is determined by using enzymatic transesterification with an immobilized *Candida Antartica* Lipase (JOCS/AOCS Official method Ch 3a-19). In short, the sn-1,3 fatty acids are hydrolysed and the sn-2 fatty acids are isolated by solid phase extraction and converted to FAME using base-catalysed methanolysis. The individual FAME are separated by GC analysis using split injection and flame ionization detection. The sn-1,3 fatty acid (FA_sn13) composition is calculated from the total molar fatty acid (FA_total) composition and the molar sn-2 fatty acid (FA_sn2) composition using the equation:

$$FA\_sn13 = (3^{*}FA\_total - FA\_sn2)/2$$

TABLE 1

| | | Milk fat fractions | | |
|---|---|---|---|---|
| | AMF | S | OS | OOOO |
| Total LCSFA content (mol %) | 50.7 | 64.5 | 52.0 | 38.4 |
| sn-1,3 LCSFA on total sn-1,3 (mol %) | 44.4 | 58.6 | 41.6 | 33.0 |
| Total C4:0 content (mol %) | 11.7 | 7.10 | 14.7 | 13.8 |

The OOOO milk fat fraction (55 g) was heated to 40° C. and blended with a 45% vegetable lipids mixture consisting of sunflower oil (16.6 wt %), rapeseed oil (10.7 wt %), high oleic sunflower oil (8.9 wt %), palm oil (3.7%), and coconut oil (5.3 wt %), resulting in a fat blend according to the invention.

As a reference, a similar blend was prepared using AMF instead of the OOOO milk fat fraction. The fatty acid characteristics of the fat blends are displayed in Table 2.

TABLE 2

| | OOOO blend | AMF blend |
|---|---|---|
| Total LCSFA content (mol %) | 29.8 | 36.5 |
| sn-1,3 LCSFA (mol %) | 28.4 | 34.7 |
| Total C4:0 content (mol %) | 7.7 | 6.5 |

In a similar way, a palm oil-free fat blend can be formulated with 55% AMF or a 55% OOOO-fraction, together with vegetable fat part consisting of sunflower oil (22.9%), rapeseed oil (11.5%), high oleic sunflower oil (9.4%), and coconut oil (1.4%). The fatty acid characteristics of the palm oil-free fat blends are displayed in Table 3.

TABLE 3

| | OOOO blend | AMF blend |
|---|---|---|
| Total LCSFA content (mol %) | 25.8 | 32.6 |
| sn-1,3 LCSFA (mol %) | 24.5 | 30.7 |
| Total C4:0 content (mol %) | 7.7 | 6.5 |

The invention claimed is:

1. Fat blend comprising:

20-65 wt % of a vegetable lipid source and 35-80 wt % of a milk fat composition comprising at least one bovine milk fat fraction, wherein the milk fat composition comprises, relative to total fatty acid moieties, 37-48 mol % of long chain saturated fatty acid moieties with 12-18 carbon atoms (LCSFA C12:0-C18:0) and wherein 28-43 mol % of all fatty acid moieties positioned on the sn-1,3 position of the glycerol backbone in said milk fat composition are long chain saturated fatty acid moieties with 12-18 carbon atoms (LCSFA C12:0-C18:0) wherein the fat blend contains only natural fats or oils and does not contain any chemically or enzymatically synthesized fats or oils.

2. Fat blend according to claim 1 wherein the milk fat composition consists of one bovine milk fat fraction and wherein 32-40 mol %, preferably 32-38 mol % of all fatty acid moieties positioned on the sn-1,3 position of the glycerol backbone in said milk fat fraction are long chain saturated fatty acid moieties with 12-18 carbon atoms (LCSFA C12:0-C18:0).

3. Fat blend according to claim 1 wherein the milk fat composition is a mixture of two or more bovine milk fat fractions.

4. Fat blend according to claim 1 wherein the milk fat composition is a mixture of (i) at least one milk fat fraction and (ii) anhydrous milk fat and/or ghee, preferably a mixture of at least one milk fat fraction and anhydrous milk fat, said anhydrous milk fat preferably bovine anhydrous milk fat.

5. Fat blend according to claim 1 wherein the milk fat fraction is obtained by a crystallization fractionation method, and preferably is the O-, OO-, OOO-, or OOOO-fraction, more preferably the OO-, OOO-, or OOOO-fraction, even more preferably the OOO- or OOOO-fraction, and most preferably the OOOO-fraction obtainable by dry fractionation of milk fat.

6. Fat blend according to claim 1 wherein the milk fat composition has a butyric acid content of 8-15 mol %, more preferably 12-15 mol %, and most preferably 13-15 mol %.

7. Fat blend according to claim 1 comprising 40-80 wt %, preferably 50-80 wt %, more preferably 55-78 wt %, and most preferably 70-75 wt % of said milk fat composition.

8. Fat blend according to claim 1 wherein the vegetable lipid source is selected from soy bean oil, (high oleic) sunflower oil, canola oil, (high oleic) rapeseed oil, ground nut oil, cotton seed oil, maize oil, olive oil, (high oleic) safflower oil, sesame oil, rice bran oil, evening primrose oil, borage oil, flax seed oil, palm oil, palm olein, palm stearin, palm kernel oil, coconut oil, and babassu oil, preferably from soy bean oil, canola oil, (high oleic) sunflower oil, (high oleic) safflower oil, coconut oil, and (high oleic) rapeseed oil.

9. Fat blend according to claim 1 wherein the blend is free from palm oils and components synthesized with or derived from palm oils.

10. Fat blend according to claim 1 having a total content of long chain saturated fatty acid moieties with 12-18 carbon atoms (LCSFA C12:0-C18:0) of 22-35 mol %, preferably 25-32 mol %.

11. Fat blend according to claim 1 wherein the total butyric acid content (C4:0) of the fat blend is in the range 4-12 mol %, preferably 6-12 mol %, most preferably 7-11 mol %.

12. Nutritional composition comprising, based on dry weight of the nutritional composition, 15-33 wt %, preferably 20-30 wt %, and most preferably 21- 28 wt % of the fat blend of claim 1, the nutritional composition preferably being an infant formula, a follow-on formula, or a growing-up formula.

13. Nutritional composition comprising the fat blend according to claim 1, the nutritional composition being an infant formula, a follow-on formula, or a growing-up formula.

* * * * *